Patented Dec. 24, 1929

1,740,543

UNITED STATES PATENT OFFICE

OTTO GERNGROSS, OF BERLIN-GRUNEWALD, AND KURT RÜLKE, OF CHARLOTTENBURG, GERMANY, ASSIGNORS, BY MESNE ASSIGNMENTS, TO KALI-CHEMIE A. G., OF BERLIN, GERMANY

DISINFECTANT, ANTISEPTIC, AND MEDICAMENT

No Drawing. Original application filed January 2, 1925, Serial No. 274, and in Germany January 28, 1924. Divided and this application filed June 26, 1926. Serial No. 118,843.

This invention is based on the recognition of the fact that thiocyanates, for instance potassium thiocyanate, which by themselves have only a slightly disinfecting action, are capable of considerably increasing the disinfectant, antiseptic and medicinal properties of heavy metal compounds, such as mercury, silver and the like, more particularly when the disinfectants or antiseptics are used in the presence of albumins, mucus, pus and the like.

For obtaining a disinfectant in accordance with the invention, potassium silver cyanide may for instance be brought into solution with suitable quantities of thiocyanate, barium thiocyanate or other thiocyanates. As potassium silver cyanide with potassium thiocyanate and the like in solution is converted to complex salts, an excess of thiocyanate must be used, i. e. it must be used in quantities exceeding those required for forming complex silver thiocyanogen compounds.

For the manufacture of the products the primary substances may be introduced in solution, as described. Or mixtures may first be made of the primary substances to be used, such as potassium silver cyanide and potassium thiocyanate, containing the constituents in suitable quantities, and these mixtures converted into the particular forms required, such as solutions, suspensions, salves, pastes, sticks. The components may also be used one after another, for intance by rubbing up one of them with a salve as a base and then adding the others. Finally several heavy metal salts may be combined and the mixture activated by means of thiocyanogen compounds, or a plurality of thiocyanogen compounds may be combined with one or more heavy metal salts. In the disinfectants or medicaments, which may be made according to the invention, other active or inactive substances may be embodied, more particularly such as are commonly used in the manufacture of disinfectants and medicaments, such for instance as saponine and other substances having the property of reducing the surface tension, for instance dextrin, starch and the like. Activating thiocyanogen compounds are those of the light metals, more particularly those of the alkalis, including ammonium, and of the alkaline earths, including magnesium.

Example 1 part potassium silver cyanide is mixed with 99 parts potassium thiocyanate. Use for instance in a 3% solution.

In this combination the presence of all the thiocyanogen compound considerably increases the effectiveness of the potaissum silver cyanide.

These agents have the further advantage that they develop only a very slight irritant action, so that they are eminently suitable for instance for use in forms, in which they come in contact with mucous membranes.

This application is a division of my copending application Ser. No. 274 filed January 2, 1925, and now Patent No. 1,606,359.

What we claim is:

1. A disinfectant antiseptic and medicament comprising the combination of a silver salt having a disinfecting action, and a light metal thiocyanogen compound.

2. A disinfectant antiseptic and medicament comprising the combination of a silver salt having a disinfecting action and an alkali thiocyanate.

3. A disinfectant antiseptic and medicament comprising the combination of silver potassium cyanide and alkali thiocyanate.

In testimony whereof we have signed our names to this specification.

OTTO GERNGROSS.
KURT RÜLKE.